(12) United States Patent
Lu et al.

(10) Patent No.: US 8,519,325 B1
(45) Date of Patent: Aug. 27, 2013

(54) OPTICAL RADIATION CONCENTRATOR

(76) Inventors: Zhenyu Lu, Boise, ID (US); Jingfeng Yuan, Boise, ID (US)

( * ) Notice: Subject to any disclaimer, the term of this patent is extended or adjusted under 35 U.S.C. 154(b) by 865 days.

(21) Appl. No.: 12/546,277

(22) Filed: Aug. 24, 2009

(51) Int. Cl.
*G01D 5/38* (2006.01)

(52) U.S. Cl.
USPC ......... 250/237 R; 250/200; 250/216; 385/31; 385/37; 385/39; 385/147; 385/900; 136/246; 136/247; 136/259

(58) Field of Classification Search
USPC ................ 385/15, 33, 31, 39, 900, 37, 147; 349/16, 56, 61, 104, 105, 193, 201; 136/247, 136/246, 259; 250/200, 216, 237
See application file for complete search history.

(56) References Cited

U.S. PATENT DOCUMENTS

| | | | |
|---|---|---|---|
| 7,463,413 B2 * | 12/2008 | Van Herpen et al. | 359/359 |
| 2008/0223438 A1 * | 9/2008 | Xiang et al. | 136/257 |
| 2010/0180946 A1 * | 7/2010 | Gruhlke et al. | 136/259 |
| 2010/0186818 A1 * | 7/2010 | Okorogu et al. | 136/259 |
| 2010/0269885 A1 * | 10/2010 | Benitez et al. | 136/246 |

* cited by examiner

*Primary Examiner* — Jennifer Doan

(57) ABSTRACT

The present invention provides a spectrally selective planar optical radiation concentrator, in which different spectral components of solar energy can be collected for different applications such as heat, illumination and electricity. The optical radiation concentrator has two basic components, an angle selective optical filter and a light redistribution reflector for collecting, trapping and concentrating radiant energy. It further comprises a light deflecting component and a fluorescent wavelength shifter to improve acceptance angle and concentration efficiency respectively. The planar optical radiation concentrator exhibits the potential for light weight, high concentration ratio and efficiency, and the ability for passive tracking.

20 Claims, 11 Drawing Sheets

OPTICAL RADIATION CONCENTRATOR

FIELD OF THE INVENTION

The present invention relates to devices for concentrating radiant energy and, more particularly, to optical concentrators for gathering optical radiation energy spanning from the ultra-violet to the infrared.

BACKGROUND OF THE INVENTION

Planar shaped solar concentrators have advantages of light weight, compact volume and good compatibility with buildings. However, due to the limitation of shape and material, planar shaped concentrators usually have lower concentration ratio and lower concentration efficiency compared with other types of concentrators such as parabolic concentrator and concentrating lens, etc.

One kind of planar concentrators is luminescent solar concentrator that is typically made of transparent media, such as glass or plastic, containing luminescent material which absorbs solar radiation and emits electromagnetic radiation at a longer wavelength with an isotropic distribution of propagating direction. Most emitted radiation will be trapped in the transparent media by the total inner reflection of the top and bottom surfaces and can only escape through the edges of the planar concentrator. As discussed in U.S. Pat. No. 4,488,047, the efficiency of this kind of concentrators is usually not high due to multiple factors such as, radiation reabsorbed by the luminescor, transmission losses of the transparent media, and non-radiative losses by photo thermal conversion and photo chemical degradation.

Another type of planar concentrators is holographic planar concentrator which applies holographic elements to change direction of incident solar radiation and trap the energy by total inner reflection of the top and bottom surfaces of a transparent media. Earlier arts including U.S. Pat. No. 4,863,224, issued to Afian et al. and U.S. Pat. No. 5,268,985 issued to Ando et al. disclose holographic concentrators and holographic light guides with single angle of incidence. U.S. Pat. Nos. 5,877,874 and 6,274,860 both issued to Rosenberg disclose a holographic planar concentrator using angularly and spectrally multiplexed holographic film to enable passive solar tracking ability and using spatial multiplexing to improve optical recoupling loss.

At current stage, holographic planar concentrators (HPC) can generally achieve higher efficiency than luminescent solar concentrators without the needs for active tracking. However, the length of HPC in light guiding direction is difficult to be increased due to optical recoupling loss, therefore the concentration ratio is low. Increasing concentration ratio will either need thicker plane of transparent material which result in higher cost and weight or need spatial multiplexing which increase cost and complexity to make. Other than that, the transparent material will also cause energy loss for light to travel over long distance. Higher transparency material will further increase cost.

Using an angle selective optical filter can be another approach to collect radiant energy. There are a few patents related to the angle selective optical filter. U.S. Pat. No. 6,992,830 issued to Mitchell et al. discloses a projection display having an angle selective coating for enhanced image contrast. U.S. Pat. No. 7,108,383 issued to Mitchell. discloses an optical system includes a reflection angle selective mirror. U.S. Pat. No. 6,667,794 issued to Arakawa et al. discloses a collimator using wavelength selective reflection system which comprises either cholesteric liquid crystal layers or a dielectric multilayer film. However, using an angle selective filter for concentrating and transferring radiant energy has not been proposed yet.

SUMMARY OF THE INVENTION

In accordance with the present invention, there is provided a spectrally selective planar optical radiation concentrator in which different spectral components of solar energy can be collected for different applications such as heat, illumination and electricity. The planar optical radiation concentrator includes an angle selective optical filter configured to be transparent for incident light within a certain range of incident angles while reflective for radiation having large incident angles exceeding the range, and a light redistribution reflector configured to reflect light with significantly increased incident angle so that light will not be able to escape from the angle selective optical filter. The concentrator of the present invention can also have more components such as a light deflecting component and a fluorescent wavelength shifter to further improve its performance.

It is an object of the present invention to provide a light-weighted concentrator with only air or vacuum between all of its components while no fill is necessary. The thickness of the concentrator can be easily changed by adjusting the distances of these components. The components of the concentrators are thin films or sheets. Increasing the length and width of the concentrator will only increase the material of those components. If the components are substantially thin, the total weight will not increase much even if the size is significantly increased.

It is another object of the present invention to provide a concentrator with high concentration ratio and efficiency. The angle selective optical filter will allow light within certain range of incident angles get into the concentrator with very small optical radiation loss. The acceptance angle can be improved by the light deflecting component to eliminate the need for tracking system. Unlike the HPC, the concentrator of the present invention has a light redistributing reflector component which can keep adjusting reflected light to proper directions avoiding light recoupling loss. Therefore, the planar optical radiation concentrator can have a substantially large length in the light guiding direction without sacrificing optical efficiency. Also, because the main media for light to travel in the concentrator is air or even vacuum, the optical loss due to transferring is minimized. As a result, substantially high concentration ratio can be achieved. With high reflectivity of the angle selective optical filter and the light redirecting reflector, high concentration efficiency can also be achieved. The fluorescent wavelength shifter is configured to be transparent and is able to convert ultra-violet radiation to radiant energy with a larger wavelength that can be absorbed by photovoltaic device more effectively, so the overall concentration efficiency can be further improved.

It is a still further object of the present invention to provide a means for transferring optical radiation. In the present invention, a light transmission pipe can also be realized by those components of the optical concentrator and, therefore, provide a high efficiency light transferring means. By connecting the angle selective filter surface of a light transmission pipe to the exit of an optical radiation concentrator, the concentration ratio can be further significantly improved by transferring radiation energy to the exit of the pipe which is much smaller.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE SPECIFIC EMBODIMENTS

Figure 1:
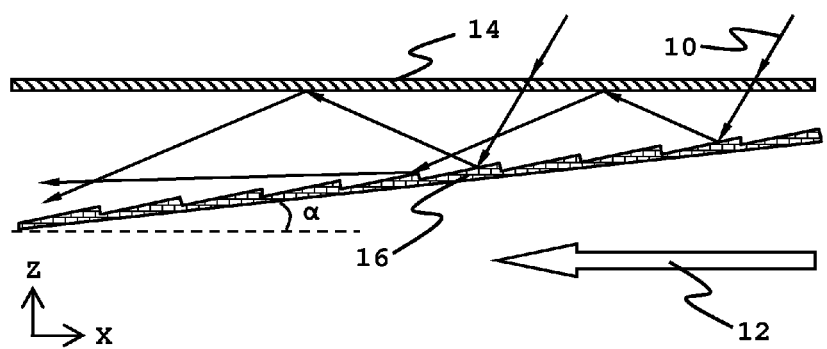
FIG. 1 is a cross-sectional view of a planar optical radiation concentrator comprising an angle selective optical filter and a light redirecting reflector which keep increasing the propagation angles of trapped light towards the light guiding direction.

FIG. 1 shows an embodiment of the optical radiation concentrator 56 which includes an angle selective optical filter 14 and a light redirecting reflector 16. The angle selective optical filter 14 is configured to be transparent for incident light 10 within a certain range of incident angles while reflective for radiation having large incident angles exceeding the range. The light redirecting reflector 16 is configured to reflect light in desired directions, so that the light can have large enough incident angle to the angle selective optical filter 14 and will be reflected by it. As a result, the light is trapped in the optical radiation concentrator 56 and propagating towards a desired light guiding direction 12.

As shown in FIG. 1, the light redirecting reflector 16 can be a sloped reflecting sheet with small sections further tilted to reflect light with increasing incident angles, so that the light can be trapped and directed closer to a desired light guiding direction 12. To achieve the same function, the light redirecting reflector 16 can also be configured with reflective microstructures on the inner major surface, such as gratings. There is light transmission medium between the angle selective optical filter 14 and the light redirecting reflector 16, as a rule for light propagation (even the vacuum of empty space is considered as a transmission medium of radiant energy). Any transmission medium with high transparency is possible for this application. There can be only air or even vacuum between the two components, so that the planar optical radiation concentrator 56 will not significantly increase weight with larger size. There are also supporting structures or substrates (not shown in the figures) for supporting the components.

Figure 2:
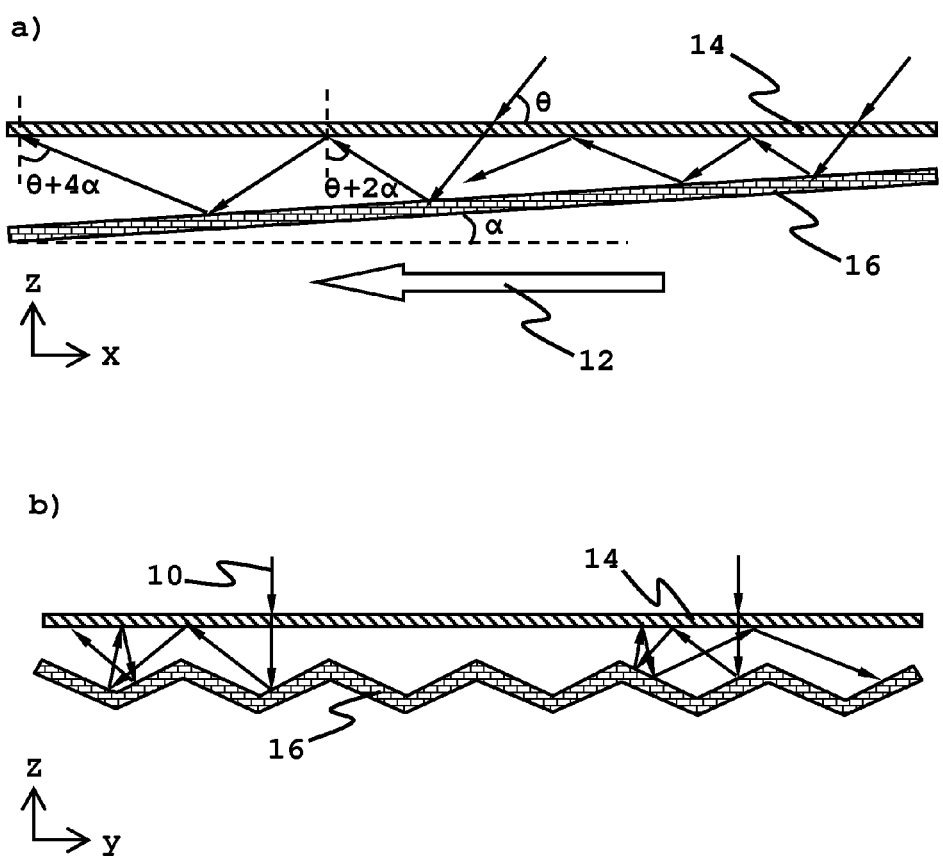
FIG. 2a is an X-Z plane cross-sectional view of a planar optical radiation concentrator comprising an angle selective optical filter and a light redirecting reflector which keep changing the angle of trapped light in a plane (Y-Z) perpendicular to the light guiding direction.
FIG. 2b is a Y-Z plane cross-sectional view of a planar optical radiation concentrator comprising an angle selective optical filter and a light redirecting reflector which keep changing the angle of trapped light in the Y-Z plane perpendicular to the light guiding direction, where the Y-Z plane is perpendicular to the X-Z plane.

Other than changing the propagation angle of light closer to the light guiding direction 12 in the X-Z plane as shown in FIG. 2a, the light redirecting reflector 16 can also be configured to change light propagation angle in a plane perpendicular to the light guiding direction 12, that is, in the Y-Z plane as shown in FIG. 2b. With large enough change of the propagation angle in the Y-Z plane perpendicular to the light guiding direction 12, the incident angle to the angle selective optical filter 14 can also be significantly increased and, thus, will not escape from the optical radiation concentrator 56. This is especially important for the first reflection of light by the light redirecting reflector 16, because the first reflection will only increase the incident angle by 2α in the X-Z plane, while the second reflection will increase it by 4α as shown in FIG. 2a. With the help of redirection effect in the Y-Z plane, the slope of the light redirecting reflector 16 in the X-Z plane can be significantly reduced, and the optical radiation concentrator 56 can be significantly planar. To achieve the same redirection effect, the light redirecting reflector 16 can also be configured with other types of grooves, sectional structures or microstructures, such as gratings.

Figure 3:
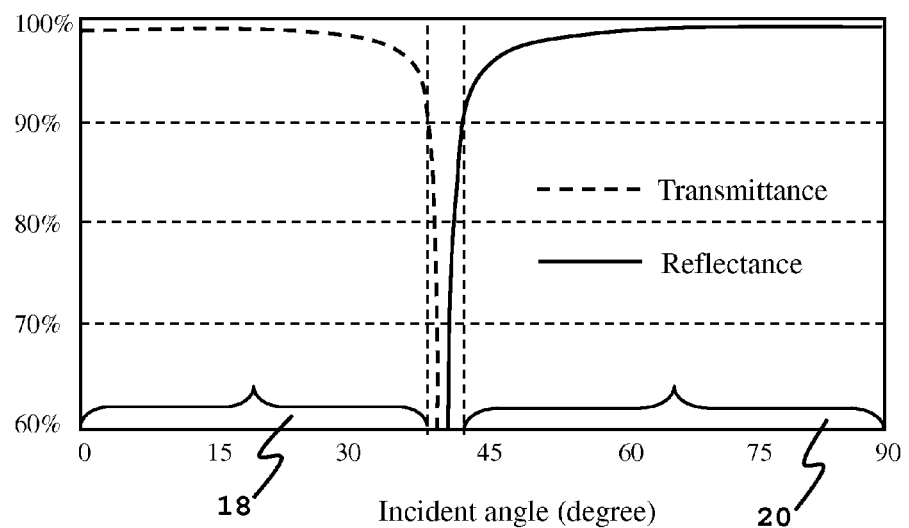
FIG. 3 is a transmittance/reflectance curve of the angle selective reflector over incidence angle for a desired spectral range.

Referring to FIG. 3 as a desired transmittance and reflectance behavior of the angle selective optical filter 14, if the incident angle of optical radiation is within the designed transmitting incident angle range 18, the optical radiation will pass through the angle selective optical filter 14 with high transmittance. On the other hand, if the incident angle is large enough in the designed reflecting incident angle range 20, light will be reflected by the angle selective optical filter 14 with high reflectivity. In this case, the sensitivity of the angle selective optical filter 14 is a key factor for the performance of the concentrator. The angular difference or the distance between the designed transmitting incident angle range 18 and the designed reflecting incident angle range 20 should be as small as possible.

To achieve the angle selective property, the angle selective optical filter 14 can be made by multiple transparent layers of at least two different refractive indexes and with certain range of thicknesses according to the selected wavelength range. For example, a distributed Bragg reflector (DBR), which consists of alternating layers of high- and low-index films having a quarter-wavelength thickness, can be highly reflective or transparent depending on the incident angle of light. (Sometimes, the periodic structure is also referred as one-dimensional photonic crystal structure.) The angle selective optical filter 14 can be designed using wavelength selective dielectric coatings by commercially available design software such as Firmstar and TF Calc, etc.

Alternatively, the angle selective optical filter 14 can be made of transparent polymer layers, for example, using reflective holographic grating films to reflect light of certain range of wavelengths with a large incident angle and allow the light with a smaller incident angle to pass through. The angle selective reflecting property can also be realized using cholesteric liquid crystal layers or metamaterials (see Ishimaru et al., *Progress in Electromagnetics Reserch,* 2005 and Schwartz et al., *J. Opt. Soc. Am. B,* 2003). More detailed discussions and descriptions were covered by previous arts and references cited in the present patent, and therefore will not be further described.

If the transmission medium between the angle selective optical filter 14 and the light redirecting reflector 16 has substantially high refractive index, the angle selective optical filter 14 can be simply a transparent layer with a lower refractive index, so that the function of angle selective filtration can be realize through total internal reflection. Metamaterials with negative refraction indexes are also candidate materials for making the angle selective optical filter 14.

Figure 4:
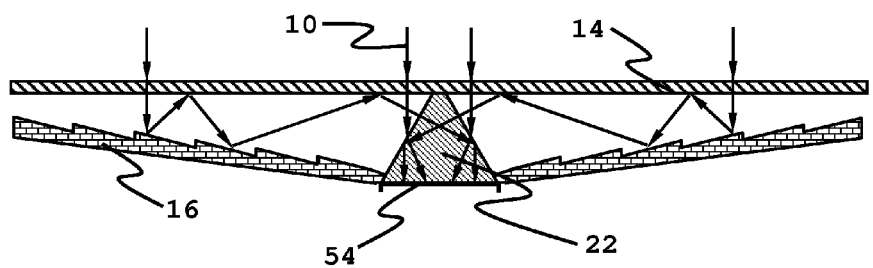
FIG. 4a is a cross-sectional view of a planar optical radiation concentrator which is able to concentrate radiant energy to its center or middle.
FIG. 4b is a top plan view of a planar optical radiation concentrator which is able to concentrate radiant energy to its center.
Figure 4:
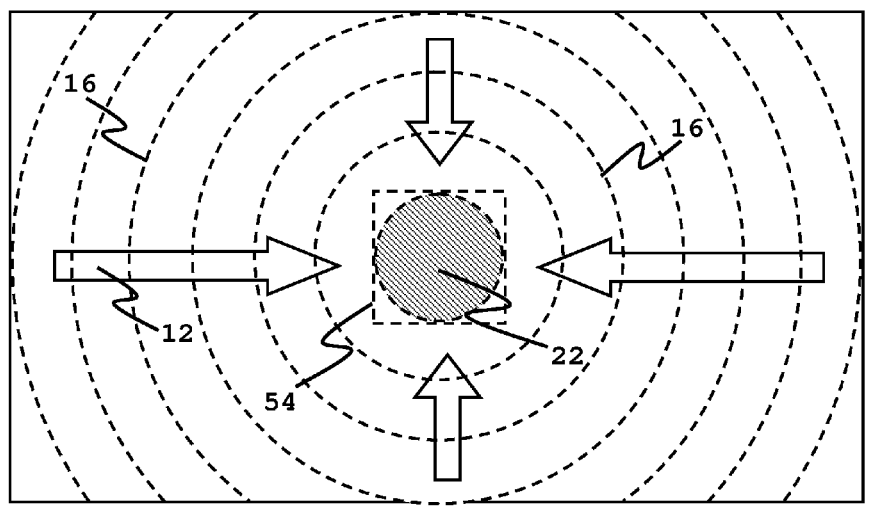

The optical radiation concentrator 56 can also focus radiant energy towards its center or middle to improve concentration ratio as shown in FIG. 4a. The center or middle of the optical radiation concentrator 56 can be further installed with a prism 22 or other type of light deflectors, so that concentrated light can be directed to the exit 54 at the bottom. It is straightforward with reflector sections having proper slopes to concentrate light to the middle line of the concentrator. While it is also possible to further improve the concentration ratio by concentrating light to a center point. Referring to FIG. 4b, the light redirecting reflector 16 is configured as a set of concentric annular reflector sections with proper slopes in each section, so that radiant energy can be concentrated to the center. Same functions can also be achieved by grooves, gratings or other micro-structures.

Figure 5:
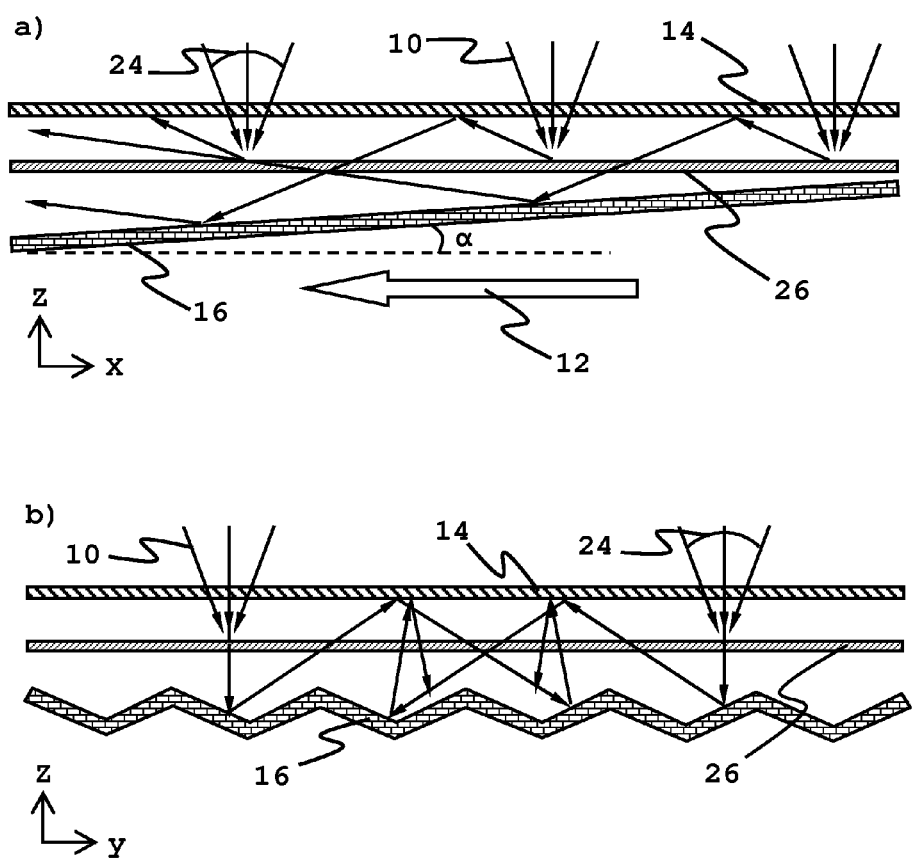
FIG. 5a is an X-Z plane cross-sectional view of a planar optical radiation concentrator with a light deflecting component which deflects light towards the light guiding direction for improving acceptance angle range.
FIG. 5b is a Y-Z plane cross-sectional view of a planar optical radiation concentrator with a light deflecting component which deflects light towards the light guiding direction for improving acceptance angle range, where the Y-Z plane is perpendicular to the X-Z plane.

An acceptance angle range 24 is a range of incident angles for optical radiation to be concentrated by an optical radiation concentrator 56. The acceptance angle range 24 of the optical radiation concentrator including only an angle selective optical filter 14 and a light redirection reflector 16 may not be wide enough for passive tracking application in certain situations, due to limited redirecting capability of the light redirection reflector 16. This can be improved by adding another component, a light deflecting component 26. The light deflecting component 26 can be added either above the angle selective optical filter 14 or in between of the angle selective optical filter 14 and the light redirecting reflector 16. The latter structure is shown in FIG. 5a, where the light deflecting component 26 is configured to bend light with incident angles in the acceptance angle range 24 to a desired direction or a range of directions, by refraction or diffraction. If light is bent with a large enough angle, it can be trapped between the angle selective optical filter 14 and the light redirecting reflector 16. In the case of having the light deflecting component 26 above the angle selective optical filter 14, light within the acceptance angle range 24 is bent to a desired direction by the light deflecting component 26, so that the light is able to enter the angle selective optical filter 14, then get trapped after the propagating direction is altered by the light redirecting reflector 16.

The light deflecting component 26 could also be connected either with the angle selective optical filter 14 or with the light redirecting reflector 16 for more compact structures. It can be made by holographic grating films or micro-prisms. However, if the deflection effect is achieved by a diffractive optical element, there will be a concern of optical recoupling loss. After light enters through the angle selective optical filter 14 with an original entering incident direction, it will first get diffracted by the light deflecting component 26, then get trapped in the optical radiation concentrator 56 and consequently pass through the light deflecting component 26 multiple times. When passing though the light deflecting component 26, if the light has the same or very close direction as it was diffracted the first time, the light will be diffracted to the original entering incident direction which will lead to a recoupling loss. This is a limiting factor for holographic planar concentrators being hard to achieve large concentration ratio, while it can be solved by the present invention.

FIGS. 5a and 5b show that, with proper geometry configuration of the light redirecting reflector 16, the light propagating direction can be changed significantly after each reflection, so that light can pass through the light deflecting component 26 multiple times without further diffraction and thus without recoupling loss. However, in order to achieve this, the grating diffraction efficiency of the light deflecting component 26 needs to be substantially sensitive to the incident angle. This means that, for light which can get diffracted with high efficiency, the incident angle range, which is the acceptance angle range 24 of the optical radiation concentrator 56 in this case, may not be made very large by angular multiplexing. To solve this issue, multiple holographic films may be stacked as one light deflecting component 26. However, in this case, the acceptance angle range 24 is still limited by the designed transmitting incident angle range 18 of the angle selective optical filter 14.

Figure 6:
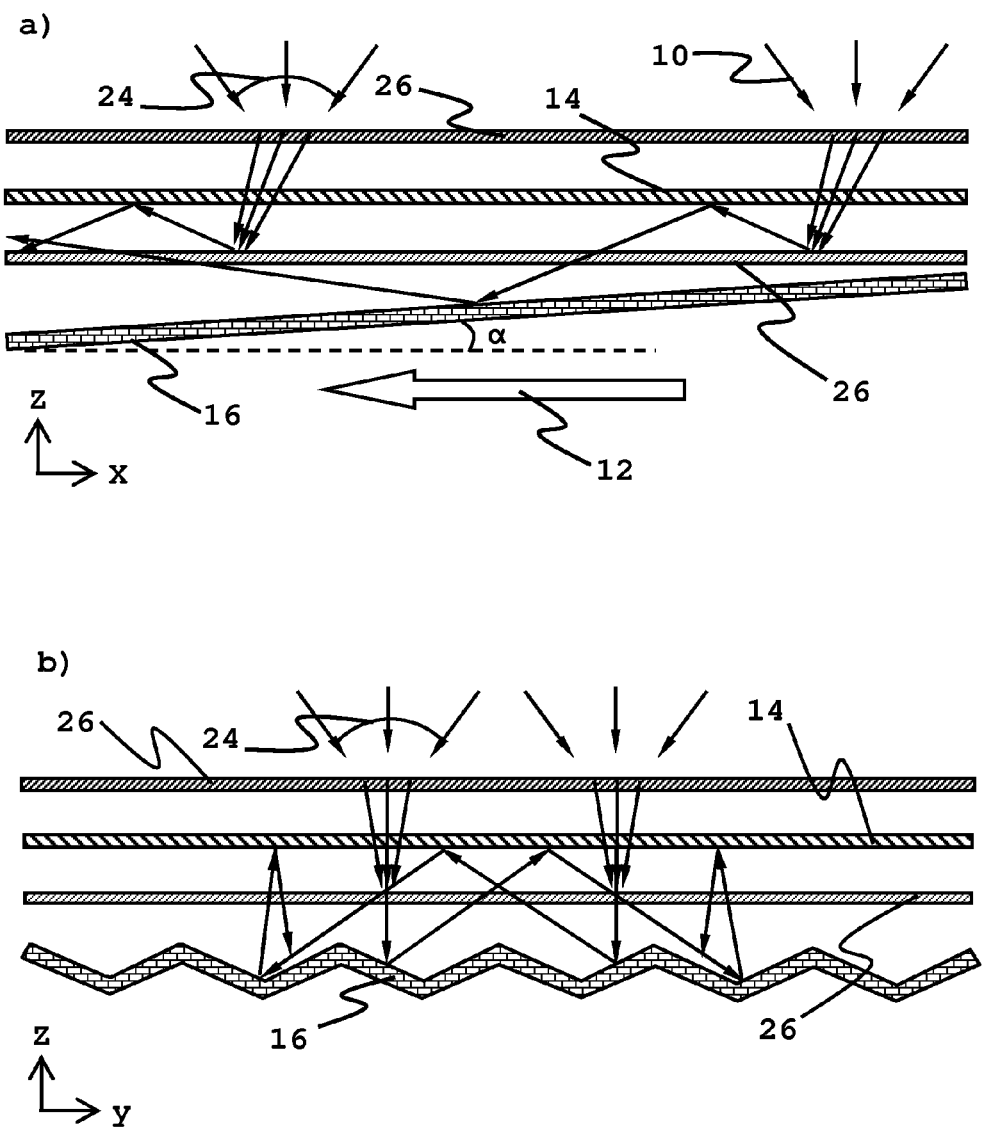
FIG. 6a is an X-Z plane cross-sectional view of a planar optical radiation concentrator with two light deflecting components for further improving acceptance angle range.
FIG. 6b is a Y-Z plane cross-sectional view of a planar optical radiation concentrator with two light deflecting components for further improving acceptance angle range, where the Y-Z plane is perpendicular to the X-Z plane.

Referring to FIGS. 6a and 6b, to further increase the acceptance angle range 24, one can add light deflecting components 26 both above the angle selective optical filter 14 and in between of the angle selective optical filter 14 and the light redirecting reflector 16. The top light deflecting component 26 will be able to deflect light from a desirable large acceptance angle range 24 to a significantly smaller range of directions within the designed transmitting incident angle range 18 of the angle selective optical filter 14. As a result, the middle light deflecting component 26 can be made substantially angle-sensitive with the smaller range of incident angles for diffraction. With such configuration, both the acceptance angle range 24 and the concentration ratio of the optical radiation concentrator 56 can be significantly improved. If the acceptance angle range 24 is large enough, the optical radiation concentrator 56 can have passive tracking ability or even eliminate the needs for tracking.

Figure 7:
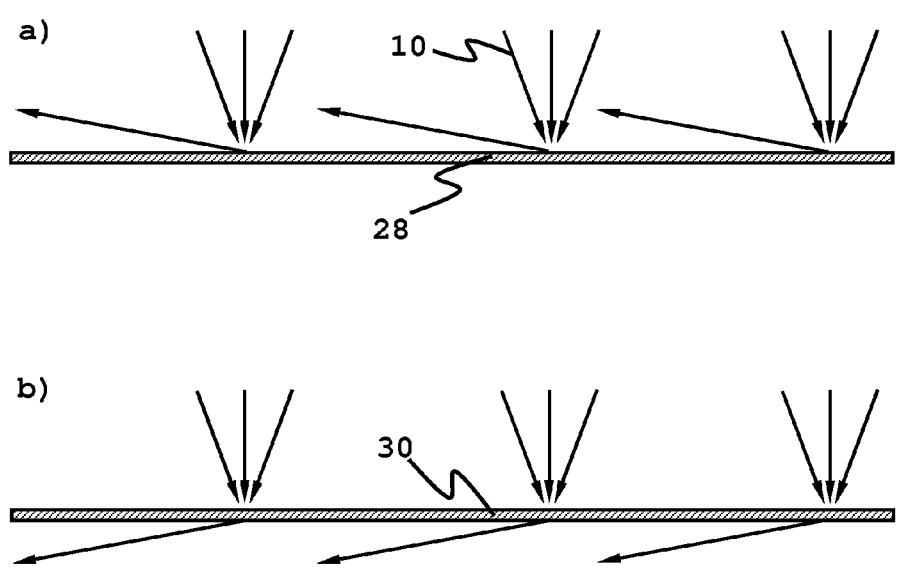
FIG. 7a is a cross-sectional view of a 2-d light tracing illustration of a light deflecting component using a reflective holographic optical element.
FIG. 7b is a cross-sectional view of a 2-d light tracing illustration of a light deflecting component using a transmissive holographic optical element.

Referring to FIG. 7a and FIG. 7b, a light deflecting component 26 can be either a reflective holographic grating element 28 or a transmissive holographic grating element 30. In a first case, when it is placed in between the other two components, either type of holographic grating elements can be applied as long as it is able to bend light to a large enough angle so that the light can be reflected by the angle selective optical filter 14 with low optical loss. In a second case, when it is placed above the angle selective optical filter 14, the transmission holographic grating element 30 is preferred with the ability to direct incident light from multiple directions to a desired direction to enter the angle selective optical filter 14. In either case, the holographic grating element needs to be angularly and spectrally multiplexed, so that it can deflect radiation in a selected range of wavelengths and within a desired range of incident angles. The selected range of wavelengths needs to be matched with that of the other components of the planar optical radiation concentrator 56 so that the concentration efficiency is optimized. To achieve high diffraction efficiency, the light deflective component can be made of multiple layers of holographic grating films with each film having a certain spectral or incident angle range.

Figure 8:
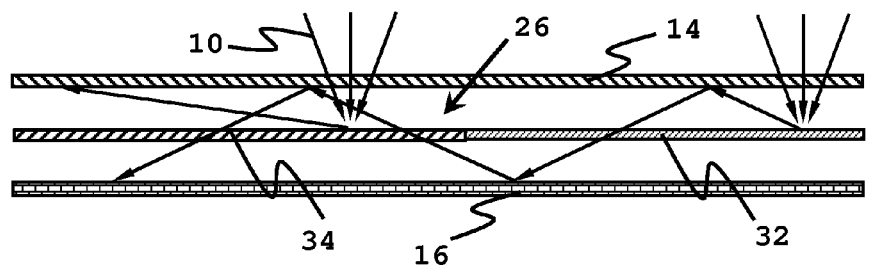
FIG. 8 is a cross-sectional view of a planar optical radiation concentrator with the light deflecting component having multiple sections which have substantially different ranges of grating vectors.

The optical radiation concentrator 56 can increase the traveling length of light within two consequential reflections in the light guiding direction 12 by increasing the distance between the angle selective optical filter 14 and the light redirecting reflector 16. As shown in FIG. 8, the light deflecting component 26 can apply different sections of holographic optical elements with different grating vectors to avoid recoupling loss, so that the light redirecting reflector 16 can be simply flat in shape and parallel to the angle selective optical filter 14. Due to larger distance between the two reflector components, the size of each section, such as section I 32 and section II 34 shown in the figure, can be substantially long. Therefore, the sectional holographic optical film will be much easier to produce compared to the spatially multiplexed holographic film applied in an HPC.

Figure 9:
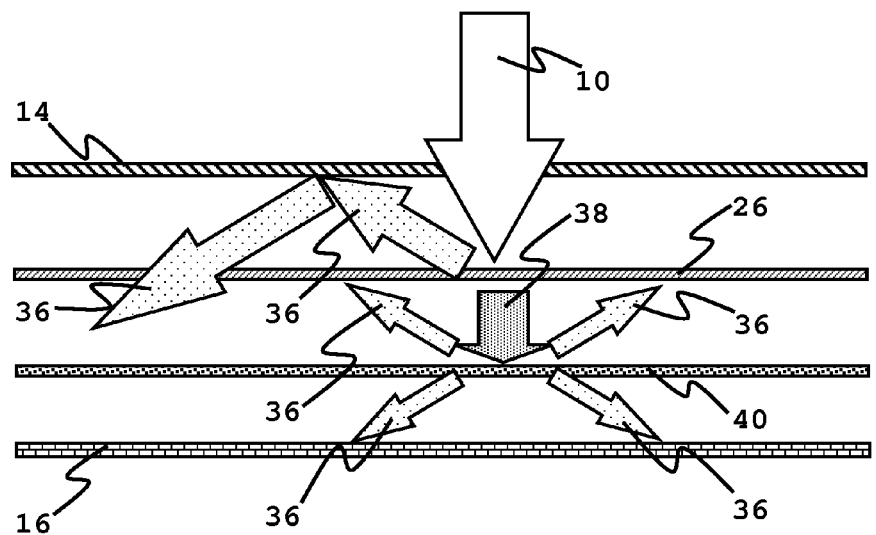
FIG. 9 is a cross-sectional view of a planar optical radiation concentrator with a fluorescent wavelength shifter for further converting UV radiation to radiant energy with a larger wavelength.

The concentration efficiency of the optical radiation concentrator 56 can be further improved by adding a transparent fluorescent wavelength shifter 40. As shown in FIG. 9, if the light deflecting component 26 has a selected wavelength range for visible and infrared radiation 36, the ultra-violet radiation 38 will pass through it without deflection. With the help of the transparent fluorescent wavelength shifter 40, the ultra-violet radiation 38 can be converted to visible or infrared radiation 36. Therefore, concentrated energy is increased by adding this converted portion of radiant energy. However, the fluorescent wavelength shifter 40 may also absorb some radiant energy passing through it, so it is critical that the fluorescent wavelength shifter 40 should have substantially high transparency to visible and infrared radiation 36.

Figure 10:
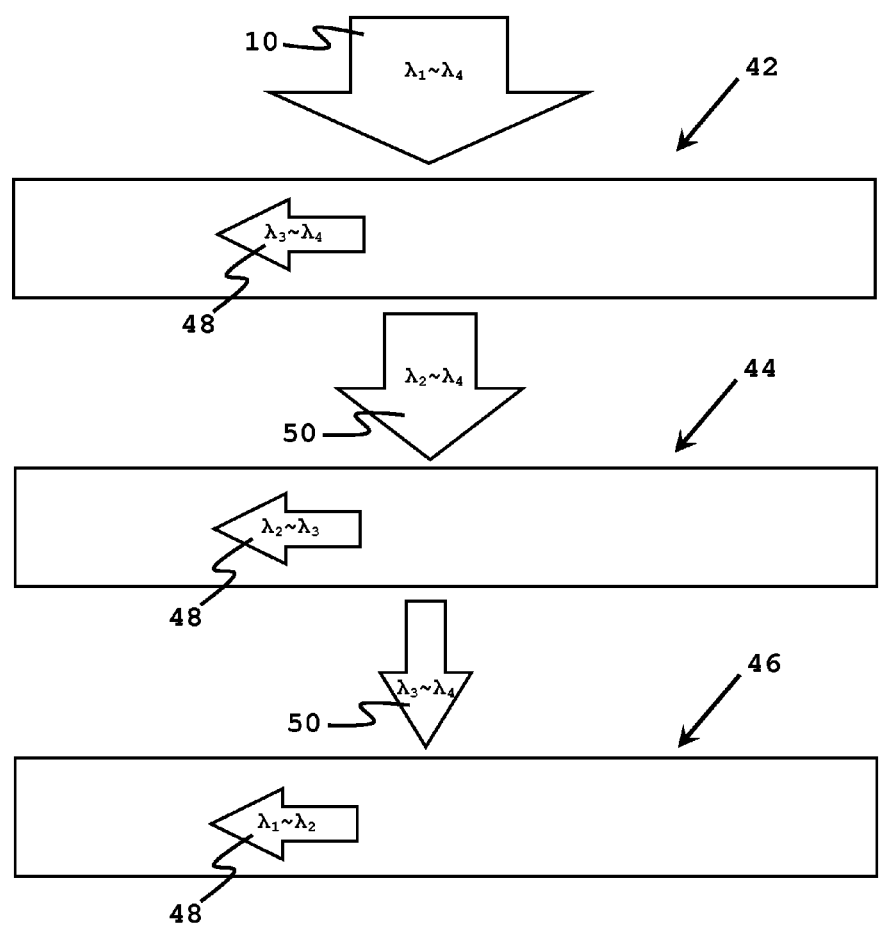
FIG. 10 is a cross-sectional view of a multi-stage planar optical radiation concentrator with each stage concentrating radial energy in a different wavelength range.

Referring to FIG. 10, if the light redirecting reflector 16 is also wavelength selective, the planar optical radiation concentrator 56 can have multiple stages with each stage having a set of those three components and be able to concentrate radiation of different range of wavelengths. As shown in FIG. 9, stage A 42, stage B 44 and stage C 46 can concentrate certain radiation with selected range of wavelengths 48 and let the rest of light pass through. The optical radiation passed through 50 from one stage can be concentrated by other stages, so that the optical radiation energy can be more efficiently collected and the components can be easier to be manufactured with narrower selective range of wavelengths. If stage C 46 concentrates the radiation with smallest wavelength and includes ultra-violet radiation 38, the fluorescent wavelength shifter 40 can be applied to it so that the concentration efficiency can be improved by converting UV to radiant energy with a larger wavelength. It is also feasible to directly use a luminescent solar concentrator as a stage for concentrating and converting ultra-violet radiation 38.

Figure 11:
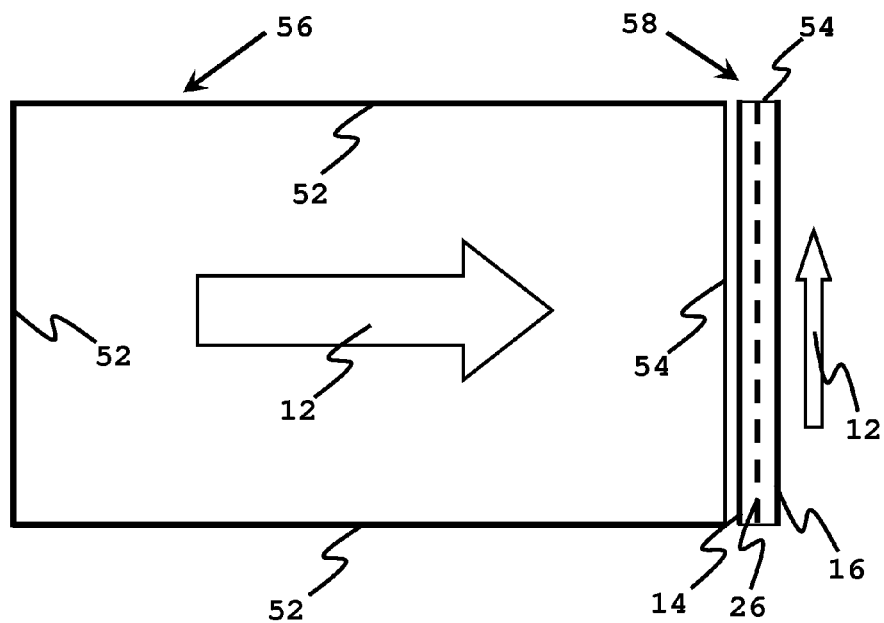
FIG. 11 is a top plan view of a planar optical radiation concentrator with a light transmission pipe for further improving concentration ratio and facilitating the transmission of radiant energy.

FIG. 11 shows that the optical radiation concentrator 56 can further improve its concentration ratio by using reflective edge seals 52 on other edges for reflecting light back to the concentrator and only leaving one exit 54 for the light guiding direction 12 and coupling a light transmission pipe 58 to the exit 54. The light transmission pipe 58 also consists of an angle selective optical filter 14, a light deflecting component 26 and a light redirecting reflector 16 and can be used for transmitting light and further improve the concentration ratio of the system. If the light deflecting component 26 of the light transmission pipe 58 has different sections of holographic optical elements with different grating vectors as shown in FIG. 8, the light redirecting reflector 16 can be made flat and angle-selective, and it can even be replaced by another angle selective optical filter 14. Therefore, the light transmission pipe 58 can be connected to two optical radiation concentrators 56 for achieving much higher concentration ratio.

Although the invention has been described with examples of substantially planar concentrators, it can also be extended to non-planar shapes for certain applications. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An optical radiation concentrator for concentrating and transferring radiant energy, comprising:

at least one angle selective optical filter, comprising a first sheet with a monolayer or multilayer structure, having substantially high transmittance for light that is incident from outside of said optical radiation concentrator upon an outer major surface of said angle selective optical filter within a designed transmitting incident angle range and also having substantially high reflectance for light that is incident from inside of said optical radiation concentrator upon an inner major surface of said angle selective optical filter within a designed reflecting incident angle range;

at least one light redirecting reflector having a predetermined distance from said angle selective optical filter, comprising a second sheet that is substantially reflective, having at least one predetermined configuration of geometry, topography or micro-structure, for redirecting light that is incident from said angle selective optical filter towards at least one trapping direction, wherein said trapping direction has an incident angle to the inner major surface of said angle selective optical filter within said designed reflecting incident angle range so that said light will be trapped in said optical radiation concentrator and guided to at least one desired direction; and a transmission medium between said angle selective optical filter and said light redirecting reflector, wherein light propagating in said transmission medium will be trapped when the angle between said light and said inner major surface of said angle selective optical filter is within a trapping angle range, and wherein applying said angle selective optical filter substantially increases said trapping angle range than without said angle selective optical filter.

2. The optical radiation concentrator as recited in claim 1, wherein said angle selective optical filter comprises a sheet having at least one predetermined configuration selected from the group consisting of surface micro-structure, metamaterial structure, photonic crystal structure, liquid crystal structure, reflective holographic grating structure, monolayer structure with a lower refractive index than that of the transmission medium between said angle selective optical filter and said light redirecting reflector, and a plurality of transparent layers having at least two different refractive indexes and at least one predetermined thickness.

3. The optical radiation concentrator as recited in claim 1, wherein said light redirecting reflector comprises a substantially reflective sheet having at least one predetermined configuration selected from the group consisting of predetermined slope to said angle selective optical filter, grooved structure, sectional structure, curved structure and diffractive grating structure.

4. The optical radiation concentrator as recited in claim 1, further comprising:
at least one light deflecting component, having a film with a plurality of diffractive or refractive micro-structures or sections, for bending light from at least a first direction to at least a second direction, such that said light can be trapped in said optical radiation concentrator and guided to at least one desired direction.

5. The optical radiation concentrator as recited in claim 4, wherein said light deflecting component comprises a film having micro-prism structure or at least one holographic optical grating element.

6. The optical radiation concentrator as recited in claim 4, wherein said light deflecting component is connected with said angle selective optical filter or with said light redirecting reflector.

7. The optical radiation concentrator as recited in claim 5, wherein said holographic optical grating element has a plurality of sections having different grating vectors.

8. The optical radiation concentrator as recited in claim 7, wherein the inner major surface of the light redirecting reflector is substantially parallel to the inner major surface of the angle selective optical filter.

9. The optical radiation concentrator as recited in claim 1, further comprising:
at least one fluorescent wavelength shifter, having a transparent film containing a predetermined fluorescent material, for converting radiation energy with at least one substantially small wavelength to radiant energy with at least one larger wavelength.

10. The optical radiation concentrator as recited in claim 1, further comprising:
at least one reflective edge seal.

11. The optical radiation concentrator as recited in claim 1, further comprising:
a device for transferring light or converting optical energy to electricity or heat, coupled to an exit of said optical radiation concentrator where optical radiation is collected and directed to.

12. The optical radiation concentrator as recited in claim 1, further comprising:
at least one light transmission pipe, having the same structural components as said optical radiation concentrator for further increasing concentration ratio and transferring radiation energy, wherein said light transmission pipe is coupled to an exit of said optical radiation concentrator.

13. The optical radiation concentrator as recited in claim 1, wherein said light redirecting reflector has at least one predetermined configuration selected from the group consisting of predetermined slope to said angle selective optical filter, grooved structure, sectional structure, curved structure and diffractive grating structure, for redirecting radiant energy towards the center or middle of said optical radiation concentrator.

14. The optical radiation concentrator as recited in claim 4, wherein said light deflecting component comprising a plurality of diffractive or refractive micro-structures or sections, for concentrating radiant energy towards the center or middle of said optical radiation concentrator.

15. The optical radiation concentrator as recited in claim 1, wherein said optical radiation concentrator further comprises a prism or another type of light redirectors for redirecting concentrated radiant energy to an exit.

16. The optical radiation concentrator as recited in claim 1, wherein said light redirecting reflector comprises a sheet that is substantially reflective to optical radiation within a first range of wavelengths and substantially transparent to optical radiation within a second range of wavelengths.

17. The optical radiation concentrator as recited in claim 16, wherein said optical radiation concentrator further comprises a plurality of the angle selective optical filters and a plurality of the light redirecting reflectors to form a plurality of stages for concentrating radiant energy of different wavelength ranges.

18. The optical radiation concentrator as recited in claim 17, wherein said optical radiation concentrator further comprises at least one fluorescent wavelength shifter, having a transparent film containing a predetermined fluorescent material.

19. The optical radiation concentrator as recited in claim 1, wherein said light redirecting reflector comprises a sheet that is substantially reflective to optical radiation within a first incident angle range and substantially transparent to optical radiation within a second incident angle range.

20. The optical radiation concentrator as recited in claim 12, wherein said light transmission pipe further comprises at least one light deflecting component, so that the light redirecting reflector of said light transmission pipe can be substantially reflective to optical radiation within a first incident angle range and substantially transparent to optical radiation within a second incident angle range, and can be connected to an additional optical radiation concentrator for further improving concentration ratio.

\* \* \* \* \*